US010319229B1

(12) United States Patent
Dow et al.

(10) Patent No.: US 10,319,229 B1
(45) Date of Patent: Jun. 11, 2019

(54) DATA MINING FOR ALERTS REGARDING ROAD CONDITIONS

(71) Applicant: International Business Machines Corporation, Armonk, NY (US)

(72) Inventors: Eli M. Dow, Wappingers Falls, NY (US); Campbell D. Watson, Brooklyn, NY (US); Guillaume Auger, White Plains, NY (US); Michael E. Henderson, South Salem, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/887,282

(22) Filed: Feb. 2, 2018

(51) Int. Cl.
*G08G 1/09* (2006.01)
*G08G 1/0967* (2006.01)
*G06N 5/02* (2006.01)

(52) U.S. Cl.
CPC ............ *G08G 1/0967* (2013.01); *G06N 5/02* (2013.01)

(58) Field of Classification Search
CPC .. G08G 1/0967; G08G 1/0968; G08G 1/0133; G08G 1/0141; G08G 1/0112
USPC ........................................................ 340/905
See application file for complete search history.

(56) References Cited

U.S. PATENT DOCUMENTS

| 2013/0338914 | A1* | 12/2013 | Weiss ................ G08G 1/09626 701/465 |
| 2014/0062725 | A1* | 3/2014 | Maston ................ G08G 1/0112 340/905 |
| 2014/0067265 | A1 | 3/2014 | Maston |
| 2016/0061625 | A1 | 3/2016 | Wang |
| 2017/0186313 | A1* | 6/2017 | Stein .................... G08G 1/0141 |

FOREIGN PATENT DOCUMENTS

CN 106127408 A 11/2016
WO WO-2008038968 A1 * 4/2008 ............... G08G 1/16

OTHER PUBLICATIONS

Beshah et al.; "Mining Road Traffic Accident Data to Improve Safety: Role of Road-related Factors on Accident Severity in Ethiopia"; Conference Papers from the 2010 AAAI Spring Symposium; Stanford, California; Mar. 22-24, 2010; 6 pages.

* cited by examiner

*Primary Examiner* — Toan N Pham
(74) *Attorney, Agent, or Firm* — Cantor Colburn LLP; Teddi Maranzano

(57) ABSTRACT

Embodiments of the invention are directed to methods and systems for forecasting hazardous road conditions. The method includes determining a plurality of sections of road to analyze and correlating the sections of roads to localized weather forecasts. The method also includes performing a road surface condition analysis for each section of road of the plurality of sections of road and based on a prediction of a hazardous road condition, generating an alert regarding the hazardous road condition.

14 Claims, 4 Drawing Sheets

DATA MINING FOR ALERTS REGARDING ROAD CONDITIONS

BACKGROUND

The present invention relates in general to the field of computing. More specifically, the present invention relates to systems and methodologies for analyzing data to predict the presence of hazardous road conditions.

Hazardous road surface conditions can be very dangerous for vehicles traveling on those roads. The presence of ice or snow on the surface greatly decreases traction, increasing stopping distance. The presence of falling snow or ground-level fog greatly decreases visibility, making it dangerous to travel at a high rate of speed. It would be useful to be able to warn people of hazardous conditions as early as possible.

SUMMARY

Embodiments of the invention are directed to methods and systems for forecasting hazardous road conditions. The method includes determining a plurality of sections of road to analyze. The method further includes correlating the sections of roads to localized weather forecasts. The method also includes performing a road surface condition analysis for each section of road of the plurality of sections of road. Based on a prediction of a hazardous road condition, generating an alert regarding the hazardous road condition.

Embodiments of the present invention are further directed to a computer system for forecasting hazardous road conditions. The system includes a memory and a processor system communicatively coupled to the memory. The processor is configured to perform a method that includes determining a plurality of sections of road to analyze. The method also includes correlating the sections of roads to localized weather forecasts. The method further includes performing a road surface condition analysis for each section of road of the plurality of sections of road. Based on a prediction of a hazardous road condition, generating an alert regarding the hazardous road condition.

Embodiments of the invention are directed to methods and systems for handling hazardous road condition alerts. The method includes receiving a road condition alert at a computer system, wherein the road condition alert warns of a section of road that is predicted to have a hazardous road condition. The method also includes determining a position of the computer system. The method further includes generating a message for a user based on the position of the computer system and the road condition alert.

Additional features and advantages are realized through techniques described herein. Other embodiments and aspects are described in detail herein. For a better understanding, refer to the description and to the drawings.

BRIEF DESCRIPTION OF THE DRAWINGS

The subject matter that is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Figure 1:
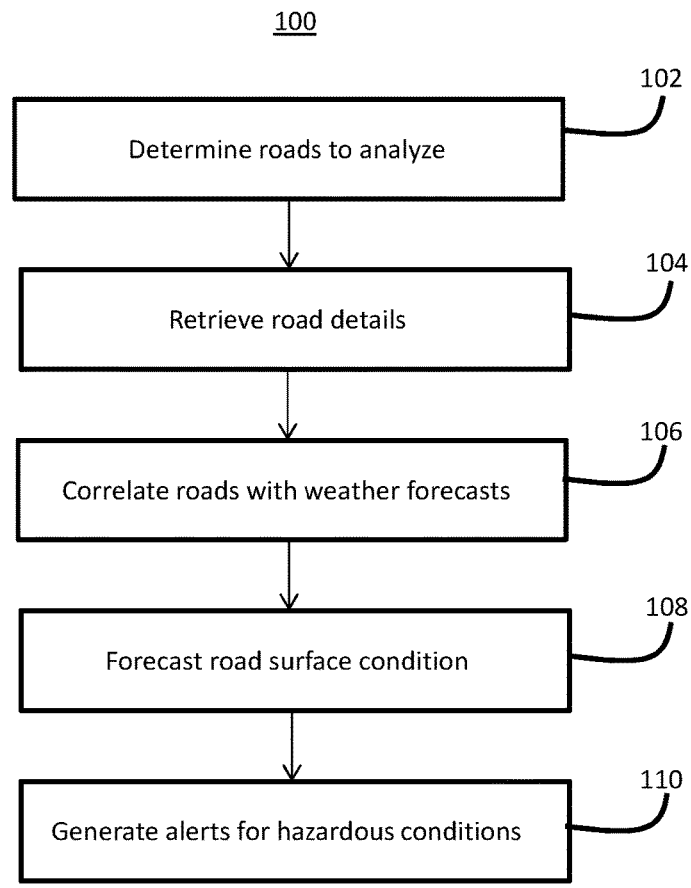
FIG. 1 is a flow diagram illustrating the operation of one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of embodiments of the invention, weather data is increasingly available. There are a variety of different sources available on the Internet that provide both weather forecasts and current weather data. These sources can be both for a wide area (for example, the forecast for an entire state) or can be localized (on the order of 50 to 1000 meters).

While localized weather forecasts are possible, weather forecasts do not always correlate to conditions of a road. For example, snow can be falling, but melt as soon as it touches the ground. Or rain can be falling, but it freezes on the ground. It is also known that certain areas of the road can encounter different conditions than other areas (e.g., bridges freeze before other road surfaces). It would be desirable to have more accurate alerts regarding the presence of hazardous road conditions.

Turning now to an overview of the aspects of embodiments of the invention, one or more embodiments of the invention address the above-described shortcomings of the prior art by determining which roads or portions of roads are likely to have hazardous road or surface conditions. Thereafter, correlating road data with weather data to forecast the presence of hazardous road conditions. Thereafter, sending alerts regarding the hazardous road conditions.

A flowchart illustrating method 100 is presented in FIG. 1. Method 100 is merely exemplary and is not limited to the embodiments presented herein. Method 100 can be employed in many different embodiments or examples not specifically depicted or described herein. In some embodiments, the procedures, processes, and/or activities of method 100 can be performed in the order presented. In other embodiments, one or more of the procedures, processes, and/or activities of method 100 can be combined or skipped. In one or more embodiments, method 100 is performed by a processor as it is executing instructions.

A set of locations is examined to determine which roads to analyze (block 102). While it may be desirable to perform a road surface analysis for a large number of roads, the simulations used to perform such an analysis can be computationally intensive. Thus, it is more efficient to perform analyses for relatively small areas of the road (on the order of 100 to 200 meters in length or whatever the granularity of weather forecast is for a particular area). A variety of factors can be used to make the determination of what sections of roads to analyze. For example, past accident report data can be retrieved. The analysis will determine which roads and portions of roads are inherently dangerous and also serve as a proxy for how busy a road is. A larger than normal accident rate at a particular location can be indicative of a dangerous road that is well-traveled. The accident reports can be retrieved from a variety of different sources. For example, police departments and insurance companies may have databases containing information regarding previous accidents. Other publicly available data also can be analyzed (or mined), such as social media sites, and photograph repositories. The mining can focus on key words related to road conditions, such as ice, snow, standing water, skid, and the like. Sections of road that have frequent occurrences of weather-related incidents can be noted. Once the sections of road to analyze have been determined, other criteria can be used to sort the roads, such as the amount of traffic. The result is an ordered list of locations for which alerts are desired.

Details about the selected sections of roads are then retrieved (block 104). Using the name of the road and location of the section of road, detailed information is gathered from a variety of different sources. This information can include geographic or topographic information, such as elevation, slope, and drainage of the road. This information can include construction information, such as the material of the road (asphalt, concrete, gravel, dirt, bridge, and the like).

The information about the road is correlated with weather forecast information (block 106). For each section of road determined above, weather forecast information can be determined. As stated above, weather forecast information is capable of being localized. Thus, a weather forecast for each section of road is located. This correlation can be accomplished using a grid method. In a grid method, each section of road is mapped and assigned a grid location. Thereafter, localized weather forecast information is associated with the grid to determine a weather forecast for each grid location of interest. While a weather forecast is discussed above, it should be understood that current weather information also can be used.

Using the weather and location information, the state (or future state) of the road surface condition at each section is estimated (block 108). A variety of techniques can be used for this determination. In some embodiments, a Fast All-Season Soil STate (FASST) model is used. A FASST model predicts ground conditions using a variety of information. The information used can include astronomical data (e.g., the position of the sun), soil or surface type, aspect angle, slope, and the presence of shade (e.g., from nearby trees). A FASST model can predict the accumulation of snow, ice, rain, ground fog, or other road conditions at various locations. Other models can be used, such as road weather models (e.g., RoadSurf) and land surface models (e.g., Noah). The geographic data (such as slope and drainage) can be used to predict the presence of standing water at each location. A fine-resolution weather model mesh and interpolation scheme is used to derive weather conditions at each location of interest. Data about the road is also used in this determination. For example, the material of the road, the presence of bridges (as stated above, bridges freeze before other areas of the road), and known water pooling locations is used as part of this determination.

The road conditions determined in block 108 is used to generate alerts regarding roads or sections of roads of interest (block 110). Alerts can be disseminated in a variety of different manners. Alerts can be sent to a centralized location, such as news organizations (e.g., radio stations or television stations) or governmental entities. The news organization or governmental entity would then be tasked with disseminating the alert information. Alerts can be posted on websites or on social media sites such as Twitter and Facebook. The handling of alerts upon receipt is discussed with respect to FIG. 2.

Figure 2:
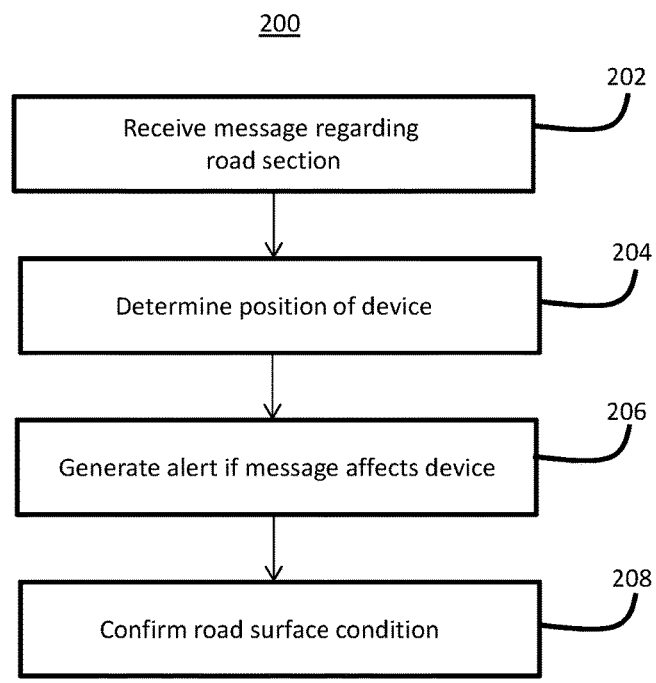
FIG. 2 is a flow diagram illustrating the operation of one or more embodiments of the present invention.

Alerts can be pushed to mobile electronic devices, such as smartphones, tablets, e-readers, laptop computers, pagers, smart watches, computers built into an automotive vehicle, and the like. With reference to FIG. 2, a flowchart illustrating method 200 is presented. Method 200 is merely exemplary and is not limited to the embodiments presented herein. Method 200 can be employed in many different embodiments or examples not specifically depicted or described herein. In some embodiments, the procedures, processes, and/or activities of method 200 can be performed in the order presented. In other embodiments, one or more of the procedures, processes, and/or activities of method 200 can be combined or skipped. In one or more embodiments, method 200 is performed by a processor as it is executing instructions.

In some embodiments, a software application (also known as an "app") can be loaded onto a mobile electronic device. In some embodiments, emergency alert features can be utilized for these features. The mobile electronic device receives a message regarding a road or section of road that has or is predicted to have a hazardous road condition (block 202). Location tracking features of the mobile electronic device (such as global positioning system (GPS) or other global navigation satellite systems) can be used to determine a position of the mobile electronic device (block 204). If the mobile electronic device is in or near an area close to the hazardous road condition, the mobile electronic device can generate an alert (block 206). The generation of alerts on mobile electronic devices can be performed in a variety of different methods, both already known or developed in the future. In some embodiments, a message is displayed on the mobile electronic device. In some embodiments, a sound is played on an audio system of the mobile electronic device. In some embodiments, a vibration is caused by the mobile electronic device. In some embodiments, a combination of two or more of the above features is used to generate the message.

Determining when to send the message can occur in a variety of different manners. If the mobile electronic device is within a certain distance of the hazardous road condition, that proximity can be used to cause the generation of a message. If mapping features of the mobile electronic device are being used, the message can be sent to each mobile electronic device that is guided to the road or section of road that is the location of the hazardous road condition. In those cases, the mapping software can be configured to alter the planned route to avoid the hazardous road condition. Even if the mobile electronic device is not scheduled to travel over the hazardous road condition, a message can be triggered to give the user a warning of an alteration of traffic patterns (e.g., the possible presence of more traffic due to others changing their travel path).

If a mapping feature has not been used, machine learning techniques can be implemented to predict if the mobile electronic device will be traveling at or near the hazardous road condition. A user's previous trips with the mobile electronic device can be used to predict a likelihood that the user will be traveling at or near the hazardous road condition. If the likelihood is above a certain amount, a message can be triggered.

Confirmation of road conditions can be forwarded back from the mobile electronic device to the sender (block 208). In some embodiments, the confirmation can be manually provided through user input. For example, a prompt can be displayed to a user, asking the user to confirm whether or not the predicted hazardous road condition is present. In some embodiments, the confirmation can be provided from sensor data. For example, an automotive vehicle with sensing capabilities can automatically sense hazardous road conditions. Wheel sensors can detect slippage of the wheels (possibly due to ice, snow, or standing water). Rain sensors can detect the presence of rain. Visual sensors, such as cameras, infrared sensors, and the like can be used to detect the presence of ice, snow, or standing water on the road. These sensors can be used in conjunction with position sensors to confirm the location of the hazardous road conditions.

Figure 3:
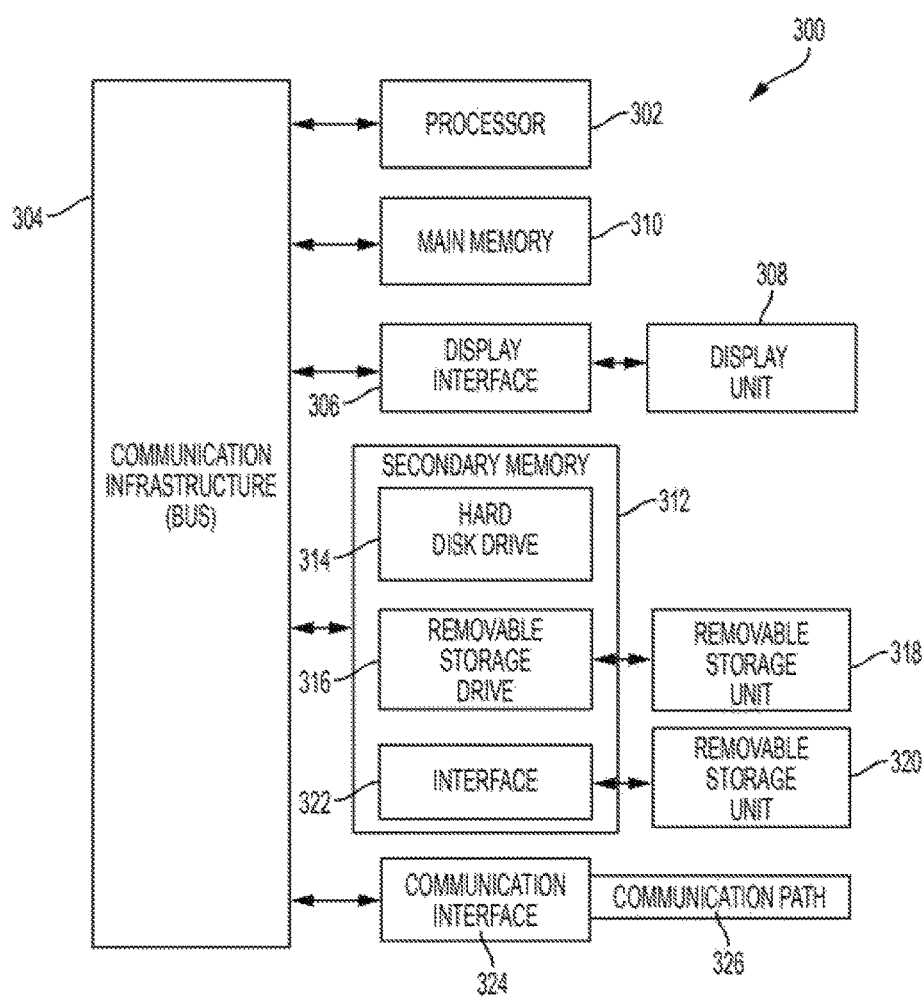
FIG. 3 is a block diagram of a computer system that can be used to implement one or more embodiments.

FIG. 3 depicts a high-level block diagram of a computer system 300, which can be used to implement one or more embodiments. More specifically, computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can also include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via a communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314.

Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the foregoing detailed description that one or more embodiments provide technical benefits and advantages.

Figure 4:
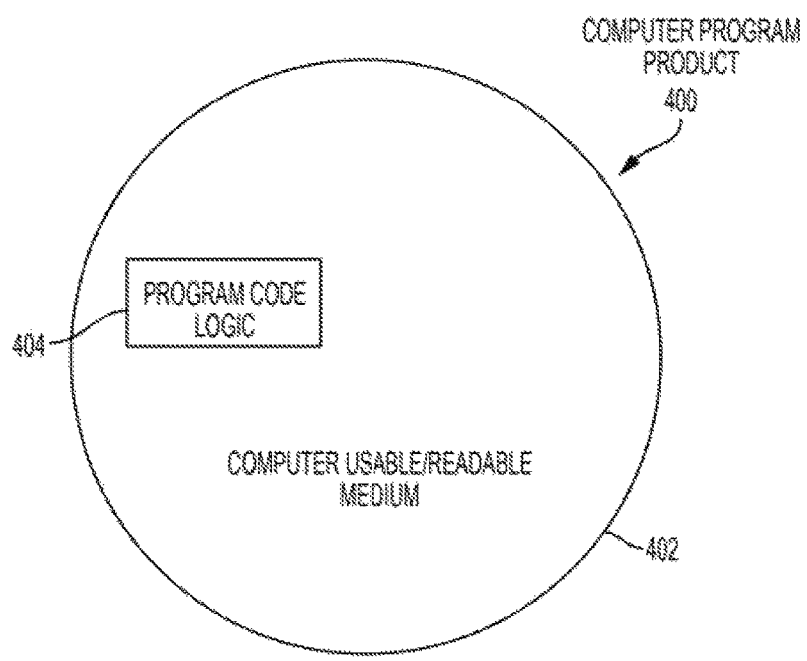
FIG. 4 is a block diagram illustrating a computer program product that can be used to implement one or more embodiments.

Referring now to FIG. 4, a computer program product 400 in accordance with an embodiment that includes a computer-readable storage medium 402 and program instructions 404 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A computer-implemented method for forecasting hazardous road conditions, the method comprising:
    determining a plurality of sections of road to analyze, wherein the plurality of sections of road are a subset of a road network and wherein the plurality of sections are determined to be inherently dangerous based on an analysis of accident data obtained from police departments and insurance company databases;
    correlating each of the plurality of sections of roads to localized weather forecasts;
    performing a road surface condition analysis for each section of road of the plurality of sections of roads to generate a prediction of a hazardous road condition; and
    based on the prediction of the hazardous road condition, generating an alert regarding the hazardous road condition.

2. The computer-implemented method of claim 1, wherein:
    the hazardous road condition comprises a section of road with accumulated snow, ice, rain, or ground fog.

3. The computer-implemented method of claim 2, wherein:
    performing the road surface condition analysis comprises performing a Fast All-Season Solid State (FASST) model based on the localized weather forecasts to find the hazardous road condition.

4. The computer-implemented method of claim 2, further comprising:
    gathering road data regarding each section of road; and wherein:
    the road surface condition analysis uses road data to find the hazardous road condition; and
    the road data comprises material of the section of road, presence of bridges, and slope.

5. The computer-implemented method of claim 2, wherein:
    the road surface condition analysis further uses astronomical data, soil type, aspect angle, and a presence of shade as inputs.

6. The computer-implemented method of claim 1, wherein:
    the alert is sent to a centralized location for dissemination.

7. The computer-implemented method of claim 1, wherein:
    the alert is pushed to mobile electronic devices.

8. A computer system for forecasting hazardous road conditions, the computer system comprising:
    a memory; and
    a processor system communicatively coupled to the memory;
    the processor system configured to perform a method comprising:
        determining a plurality of sections of road to analyze, wherein the plurality of sections of road are a subset of a road network and wherein the plurality of sections are determined to be inherently dangerous based on an analysis of accident data obtained from police departments and insurance company databases;
        correlating each of the plurality of sections of roads to localized weather forecasts;
        performing a road surface condition analysis for each section of road of the plurality of sections of road to generate a prediction of a hazardous road condition; and
        based on the prediction of the hazardous road condition, generating an alert regarding the hazardous road condition.

9. The computer system of claim 8, wherein:
    the hazardous road condition comprises a section of road with accumulated snow, ice, rain, or ground fog.

10. The computer system of claim 9, wherein:
    performing the road surface condition analysis comprises performing a Fast All-Season Solid State (FASST) model based on the localized weather forecasts to find the hazardous road condition.

11. The computer system of claim 10, wherein:
    the road surface condition analysis further uses astronomical data, soil type, aspect angle, and a presence of shade as inputs.

12. The computer system of claim 9, wherein the processor system is further configured to:
    gather road data regarding each section of road; and wherein:
    the road surface condition analysis uses road data to find the hazardous road condition; and
    the road data comprises material of the section of road, presence of bridges, and slope.

13. The computer system of claim 8, wherein:
    the alert is sent to a centralized location for dissemination.

14. The computer system of claim 8, wherein:
    the alert is pushed to mobile electronic devices.

* * * * *